United States Patent [19]

Okawa

[11] Patent Number: 5,570,330
[45] Date of Patent: Oct. 29, 1996

[54] OPTICAL DISK APPARATUS UTILIZING EXCLUSIVELY ALLOCATED SERVO SIGNAL PROCESSING REGISTERS

[75] Inventor: Sumihiro Okawa, Kanagawa, Japan

[73] Assignee: Sony Corporation, Japan

[21] Appl. No.: 250,297

[22] Filed: May 27, 1994

[30]  Foreign Application Priority Data

May 27, 1993 [JP] Japan .................................. 5-126223

[51] Int. Cl.[6] ................................................ G11B 7/095
[52] U.S. Cl. .................................. 369/44.32; 369/44.34; 369/50; 369/54
[58] Field of Search ........................... 369/44.11, 44.29, 369/44.35, 44.41, 48, 54, 59, 116, 124, 50, 44.32, 44.34

[56]  References Cited

U.S. PATENT DOCUMENTS

| | | | |
|---|---|---|---|
| 4,956,832 | 9/1990 | Miyasaka | 369/44.11 |
| 4,989,194 | 1/1991 | Aoi | 369/44.27 |

FOREIGN PATENT DOCUMENTS

| | | |
|---|---|---|
| 0125776A2 | 11/1984 | European Pat. Off. . |
| 0263187A1 | 4/1988 | European Pat. Off. . |
| 0395403A2 | 10/1990 | European Pat. Off. . |
| 3831923A1 | 3/1989 | Germany . |
| WO92/15068 | 9/1992 | WIPO . |

OTHER PUBLICATIONS

Motorola, Inc., "DSP56000/DSP56001 Digital Signal Processor User's Manual," DSP56000UM/AD–Rev. 2, 1990, pp. 1—1 through 3-13 (no month).

IBM Technical Disclosure Bulletin, vol. 31, No. 6, Nov. 1988, New York US, pp. 446–453, XP000253537 'Realtime Task Dispatcher for Multiloop Control Systems'.

Motorola Semiconductor Master Selection Guide Guide Rev 5, Motorola, Inc. 1992 Previous Edition 1991–pp. i, 2.1–3.

*Primary Examiner*—W. R. Young
*Attorney, Agent, or Firm*—Limbach & Limbach L.L.P.

[57]  ABSTRACT

An optical disk apparatus in which data is stored in internal registers of a digital signal processor need not be saved and returned when a servo processing based on an interrupt processing routine is executed. Internal registers of the digital signal processor are allocated. At least one group of the divided internal registers is exclusively allocated to the execution of a servo signal processing interrupt routine and the other groups of internal registers are exclusively allocated to execute a system control processing. With such allocations, when a sampling interrupt occurs, servo signal processing of a focus servo signal processing and a tracking servo processing is carried out without saving data from the internal registers of the digital signal processor. After servo processing is completed, the interrupt processing routine can be ended without returning data to the internal registers

12 Claims, 6 Drawing Sheets

Embodiment (Continuous Servo System)

Sampling Period Interrupt Timing

FIG. 4

Sampling Interrupt Routine Executed When Data Area Saved/Returned To Registers (PRIOR ART)

FIG. 5

Sampling Interrupt Routine Executed When Data Are Not Saved/Returned To Registers (Embodiments)

FIG. 6 of the present invention to provide an optical disk apparatus in which data in internal registers of a digital signal processor need not be saved and returned.

OPTICAL DISK APPARATUS UTILIZING EXCLUSIVELY ALLOCATED SERVO SIGNAL PROCESSING REGISTERS

BACKGROUND OF THE INVENTION

1. Field of the Invention

The present invention relates generally to an optical disk apparatus, and in particular to memory allocation within an Optical disk apparatus.

2. Description of the Related Art

Optical disk apparatus have hitherto used a digital signal processor ("DSP") in order digitally process servo signals through the execution of programs or routines, which are also referred to as software or firmware.

In software servo processing, a focusing error signal and a tracking error signal contained within an output signal of a quadrant diode type of optical pickup are converted by an analog-to-digital ("A/D") converting circuit into digital signals. These digital signals are supplied through a bus line to a DSP. The DSP then processes these digital signals supplied thereto in accordance with a predetermined routine or program in some suitable signal processing fashion, such as a phase compensation or the like. The processed digital signals are supplied through a digital-to-analog ("D/A") converting circuit and a driver to a focusing actuator and to a tracking actuator of the optical pickup.

In a conventional optical disk apparatus in which the DSP executes the software servo processing, the DSP is also utilized to execute processing other than the servo processing, such as system control or the like. In such a conventional optical disk apparatus, servo processing has a higher interrupt processing priority. Therefore, at the beginning of the interrupt processing (interrupt routine), data in the internal registers of the DSP are stored in and saved in a data RAM of the DSP. At the completion of interrupt processing, data is returned to the internal registers from the data RAM.

A typical digital signal processor used in conventional optical disk apparatus is one manufactured and sold by the Motorola, Inc., Semiconductor Products Sector, 3102 Noah 56th Street, Phoenix, Ariz. 85018 under the model designation DSP56001. The DSP56001 is a24-bit fixed-point general purpose digital signal processor which features three single-cycle execution units, namely, a data arithmetic logic unit, an address arithmetic unit and a program controller, all of which operate in parallel at instruction speeds of up to 16.5 MHz. The DSP56001 also contains an on-chip program random access memory (RAM). Using such a DSP, a time or period corresponding to 68 steps is required in order to save and return data because this DSP contains a total of 34 internal registers. In further detail, assuming an operation speed of the DSP is 100 nsec/step, and a servo signal sampling rate of 30 kHz, then 333 steps (1/30 kHz/100 nsec) of the program at maximum can be executed in one interrupt routine. As a consequence, about 20% of the time is consumed in order to save and return data from and to the internal registers.

If 200 steps are consumed to effect servo signal processing, then only 65 steps {333−(200+68)}can be used to execute signal processing other than the servo signal processing, such as system control processing or the like within one sampling period and a time of only 6.5 μs is available. In worst cases, it becomes necessary to utilize a microcomputer in addition to the DSP, in order to execute system control processing or the like.

Therefore, it would be desireable to provide a method and apparatus for more efficient utilization of a digital signal processor by reducing the number of steps required to process and store information such as a servo signal information.

BRIEF DESCRIPTION OF THE INVENTION

In view of the aforesaid problem, it is therefore an object of the present invention to provide an optical disk apparatus in which data in internal registers of a digital signal processor need not be saved and returned.

It is a feature of the present invention to allocate a group of internal registers exclusively to execution of servo signal processing and to allocate other groups of internal registers to processing functions such as system control.

It is an advantage of the present invention to reduce the number of processing steps necessary to utilize a servo signal.

According to one aspect of the present invention there is provided an optical disk apparatus having a digital signal processor for executing a signal processing, in which a portion of the internal registers in the digital signal processor are allocated exclusively to the execution of a first priority interrupt processing.

According to another aspect of the present invention, the first priority interrupt processing is servo signal processing.

According to the present invention, a portion of the internal registers in the digital signal processor are allocated to exclusively to the execution of a first priority interrupt processing so that, even when the first priority interrupt processing occurs, during that interrupt routine, data in the internal registers of the digital signal processor, including the registers that are allocated exclusively to the interrupt processing, need not be saved and returned.

Thus, when the first priority interrupt processing is the servo signal processing, it becomes easy to execute the servo signal processing and other processing, such as a system control processing or the like, using only the digital signal processor.

These and other objects, features and advantages will become apparent when considered with reference to the following description and the accompanying drawings.

DETAILED DESCRIPTION OF THE PREFERRED EMBODIMENTS

Figure 1:
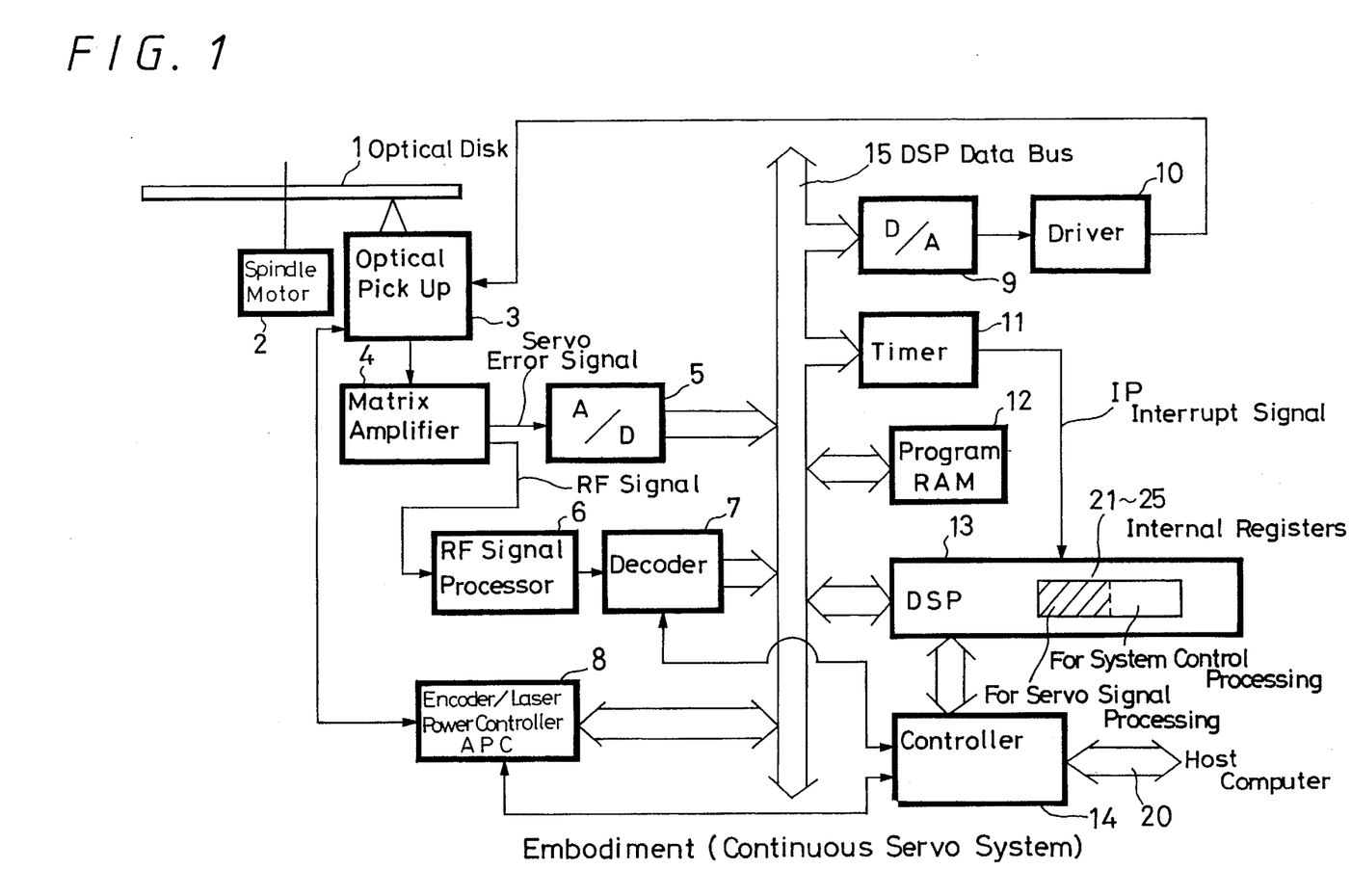
FIG. 1 is a block diagram showing an arrangement of an optical disk apparatus according to an embodiment of the invention which utilizes a continuous servo system.

FIG. 1 illustrates an arrangement of an optical disk apparatus based on the continuous servo system according to an embodiment of the present invention. The optical disk apparatus of FIG. 1 includes an optical disk 1, such as a magneto-optical disk or the like. The optical disk 1 is rotated by a spindle motor 2 at, for example, a constant angular velocity ("CAV").

An optical pickup 3 having a laser diode therein is disposed in an opposing relation to the disk surface of the disk 1. Light from the laser diode is reflected by the rotating optical disk 1, and the reflected light is sensed by a photodetector, a quadrant photo-diode or the like, within optical pickup 3. A servo signal and a radio frequency ("RF") signal generated from an output signal of the photo-detector is amplified by a matrix amplifier 4 in a predetermined calculation fashion and are then supplied to both an A/D converting circuit 5 and an RF signal processor circuit 6, respectively.

The RF signal processing circuit 6 processes the RF signal, which corresponds to the reproduced signal supplied thereto, to provide both a binary data signal and a reproduced clock signal. The binary data signal and the clock signal are supplied to a decoder 7. The decoder 7 demodulates the binary data signal and also extracts address information of the optical disk 1. An encoder/laser power controller 8 modulates the data signal and automatically controls the intensity of laser light from a laser diode included in the optical pickup 3 so that an incoming data signal may, if desired, be recorded on the optical disk 1, when such optical disc contains a magnetic recording layer. In the case of recording, the intensity of the laser light from the laser diode is such that on a recording track of disk 1, a succession of spots are heated to a point above the Curie temperature (which varies depending upon the magnetic material utilized for the magnetic recording layer) to thereby dissipate any previous magnetic orientation. As the spots on the disk 1 move away from the laser diode, they cool to below the Curie temperature, and a new magnetic orientation corresponding to the incoming data signal is created by a magnetic head 17. The encoder/laser power controller 8 provides to a magnetic head driving circuit 19 a signal representative of the incoming data signal. The magnetic head driving circuit 19 in turn drives the magnetic head 17 in accordance with such signal representative of the incoming data signal.

The A/D converting circuit 5, the decoder 7 and the encoder/laser power controller 8 are connected to the DSP 13 through a DSP data bus 15. Also connected to the DSP data bus 15 are a program RAM 12, which serves as a memory for storing therein an operation program of the DSP 13, and a D/A converting circuit 9. An output signal from the D/A converting circuit 9 drives, through a driver 10, a focusing actuator, a tracking actuator and a slide motor included in the optical pickup 3. The D/A converting circuit 9 may be replaced with other suitable circuitry, such as a pulse width modulating circuit or the like.

The DSP 13 phase-compensates a servo error signal supplied thereto through the DSP data bus 15 from the A/D converting circuit 5 to thereby generate a signal under which control the above-mentioned actuators or the like included in the optical pickup 3 are operated. Also, the DSP 13 controls the encoder/laser power controller 8 in response to operation of the optical disk apparatus, such as recording, reproducing, erasing or the like, and controls the optical pickup 3 with reference to the address information of the optical disk 1 supplied thereto from the decoder 7.

A controller 14 exchanges various commands and status data between it and the DSP 13, and is connected to a host computer through an interface 20, such as a small computer system interface ("SCSI") or the like. The controller 14 is supplied with data reproduced from the optical disk 1 through the decoder 7. The controller 14 also supplies data to be recorded on the optical disk 1 to the optical pickup 3 through the encoder/laser power controller 8. The controller 14 generates timing signals that are required by the optical disk apparatus to execute operations, such as recording, reproducing, erasing or the like, and controls the decoder 7 and the encoder/laser power controller 8. Furthermore, a program that is stored in the program RAM 12 is transferred to the program RAM 12 from the controller 14 through the DSP 13. The controller 14 therefore includes a ROM in which there is stored a program that is to be transferred to the program RAM 12.

A timer circuit 11 generates a certain constant sampling period TS by counting system clock signals of the DSP 13. Timer circuit 11 also generates and supplies to the DSP 13 an interrupt signal IP at every sampling period (e.g., 33.3 μsec if a sampling rate is assumed to be 30 kHz). The DSP 13 executes a servo signal processing routine, which is the interrupt processing, in response to the interrupt signal supplied thereto from the timer circuit 11. In this embodiment, the servo signal processing routine is the first priority interrupt processing routine.

Figure 2:
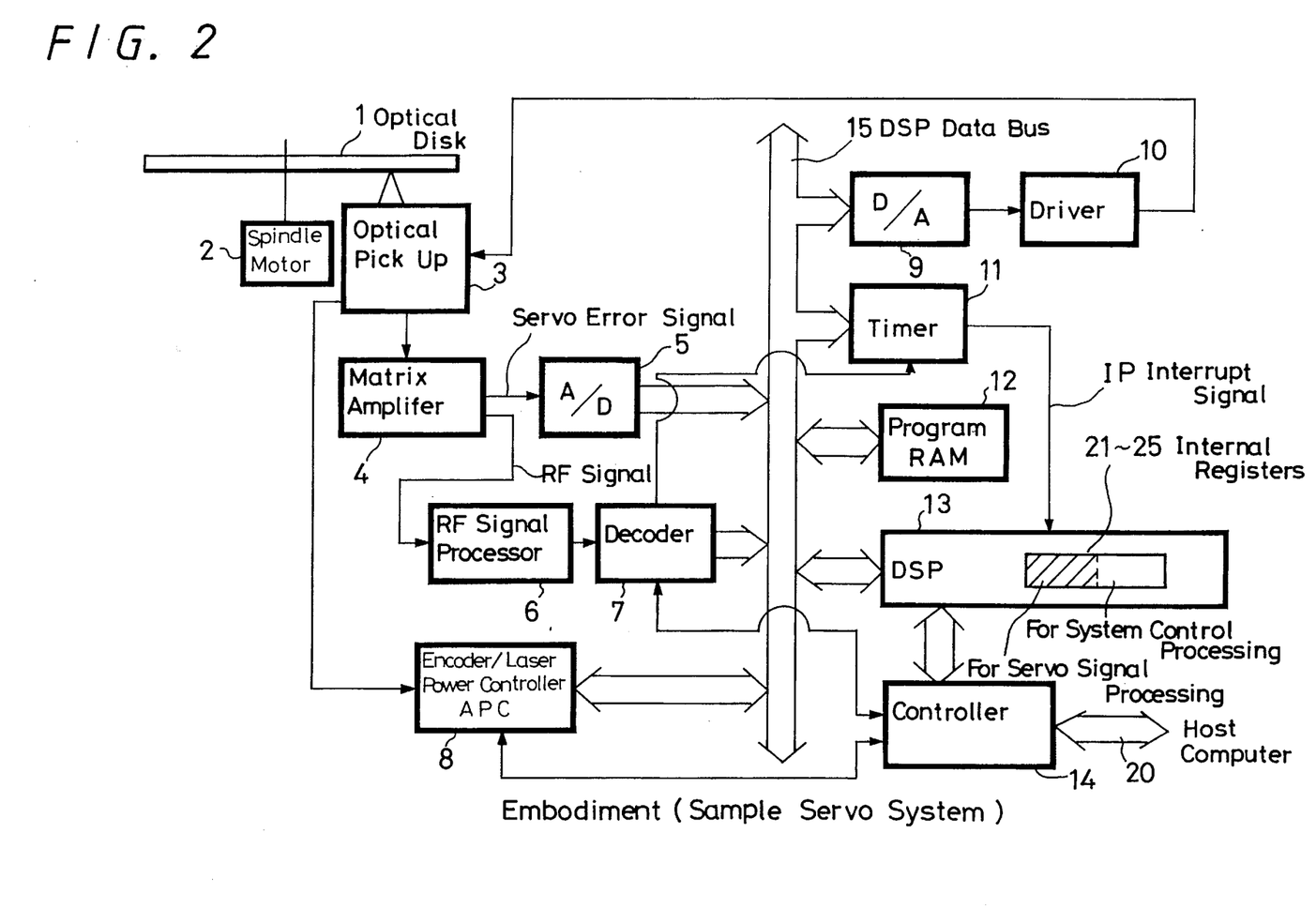
FIG. 2 is a block diagram showing an arrangement of an optical disk apparatus according to another embodiment of the invention which utilizes a sample servo system.

In contrast to the continuous servo system of the optical disk apparatus shown in FIG. 1, FIG. 2 shows an arrangement of an optical disk apparatus having a sample servo system. In the optical disk apparatus of the sample servo system shown in FIG. 2, elements and parts that are identical to those of FIG. 1 are marked with the same references and therefore need not be described in detail. In the embodiment shown in FIG. 2, a servo clock signal and a sampling timing signal are generated by the RF signal processing circuit 6 and the decoder 7 from servo pits that have been recorded on the optical disk 1. The timer circuit 11 generates a sampling interrupt timing signal, i.e., interrupt signal IP on the basis of these signals. In addition, in contrast to the embodiment of FIG. 1, an output of decoder 7 is coupled to timer circuit 11.

Figure 3A:
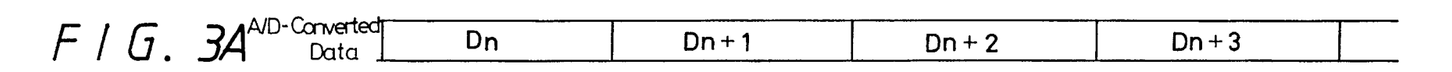
FIGS. 3A, 3B and 3C are timing diagrams illustrating an interrupt timing of a sampling period in the optical disk apparatus of the embodiments shown in FIGS. 1
Figure 3B:
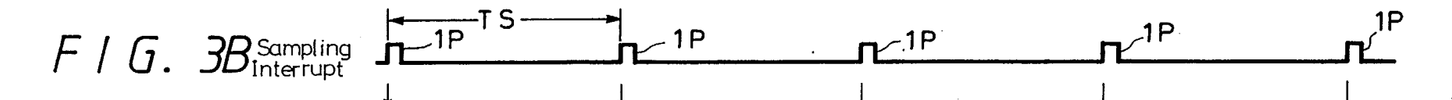
Figure 3C:
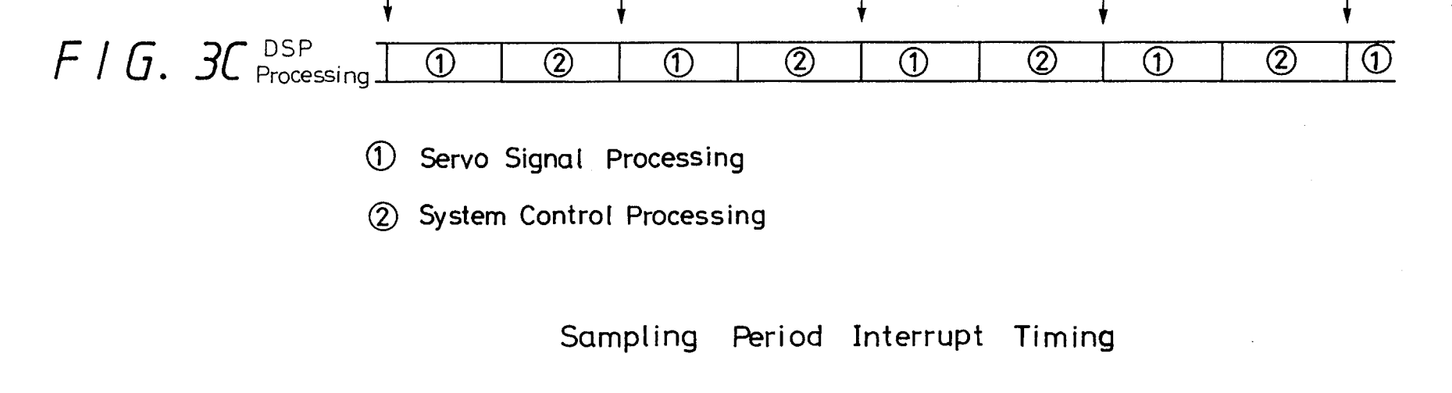

Referring now to FIGS. 3A, 3B and 3C, these figures show timings at which the DSP 13 in the embodiments of FIGS. 1 and 2 execute processing in response to the interrupt signal IP supplied thereto. The timer circuit 11 generates the interrupt signal IP within the time that the A/D converting circuit 5 finishes one cycle of the A/D conversion of the servo error signal such as a focusing error signal or the like (that is, within the time A/D-converted data Dn, Dn+1, . . . are completely generated as illustrated in FIGS. 3A and 3B).

Figure 6:
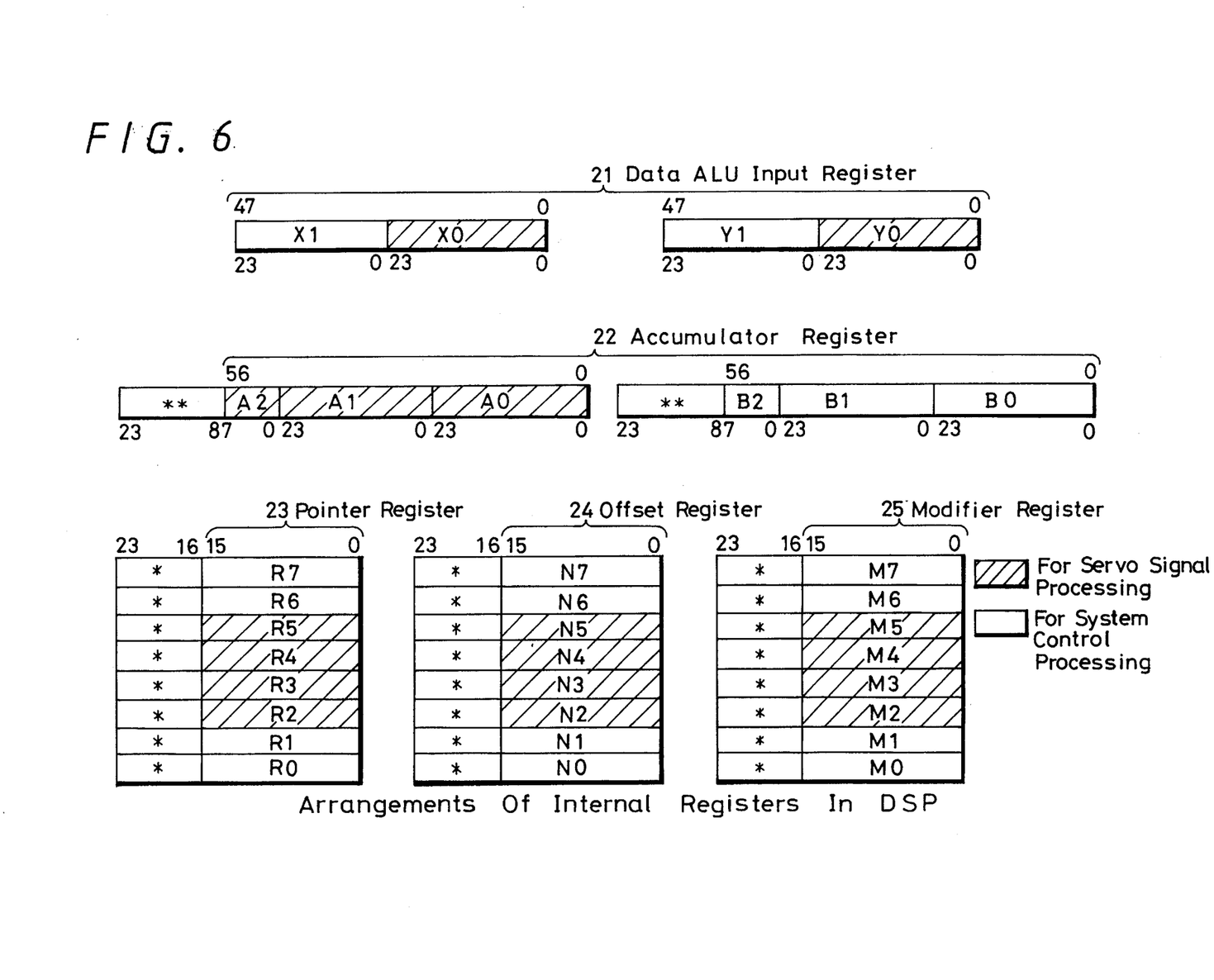
FIG. 6 is a diagram illustrating divisions of the internal registers of the DSP shown in the embodiments of FIGS. 1 and 2

Although the DSP 13 is generally executing a system control processing 2, when supplied with the interrupt signal IP (when the interrupt occurs), it interrupts this processing and executes servo signal processing 1, whereafter it resumes the system control processing 2. Therefore, data within internal registers 21 through 25 in the DSP 13, as shown in FIG. 6, is retained unchanged when the system control processing 2 is interrupted and resumed.

Figure 4:
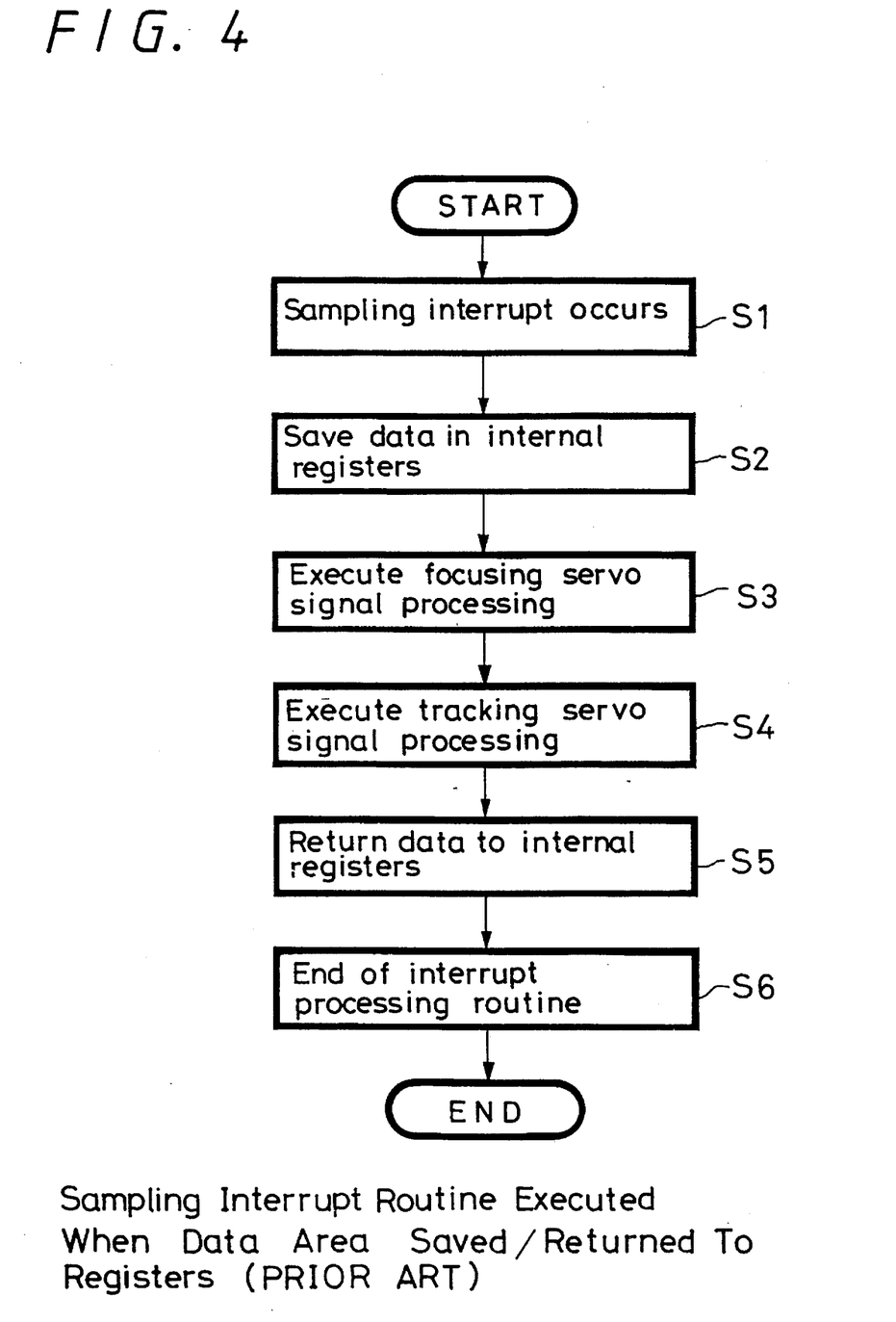
FIG. 4 is a flowchart of a sampling interrupt routine of the prior art.

In the prior art, in order to retain data in the internal registers 21 through 25 unchanged, processing shown in the flowchart of FIG. 4 is executed. Specifically, when a sampling interrupt occurs (at step S1), data in all of the interrupt registers 21 through 25 of the DSP 13 are saved in a data RAM (not shown) in the DSP 13 (at step S2). Thereafter, the DSP 13 executes a focusing servo processing (at step S3) and tracking servo processing (at step S4) which are the interrupt processing on the basis of the A/D-converted data Dn. After this servo processing 1, data are returned to the internal registers 21 through 25 (at step S5), whereby the interrupt processing routine is ended (at step S6). When, however, data are saved from and returned to the internal registers 21 through 25 as described above (at steps S2, S5), the time available for system control processing 2 is reduced as earlier noted in the paragraph of the related art. Due to this condition, it is frequently observed that interface processing between the DSP 13 and the controller 14 is delayed and that control of the encoder/laser power controller 8 by the DSP 13 is delayed.

Figure 5:
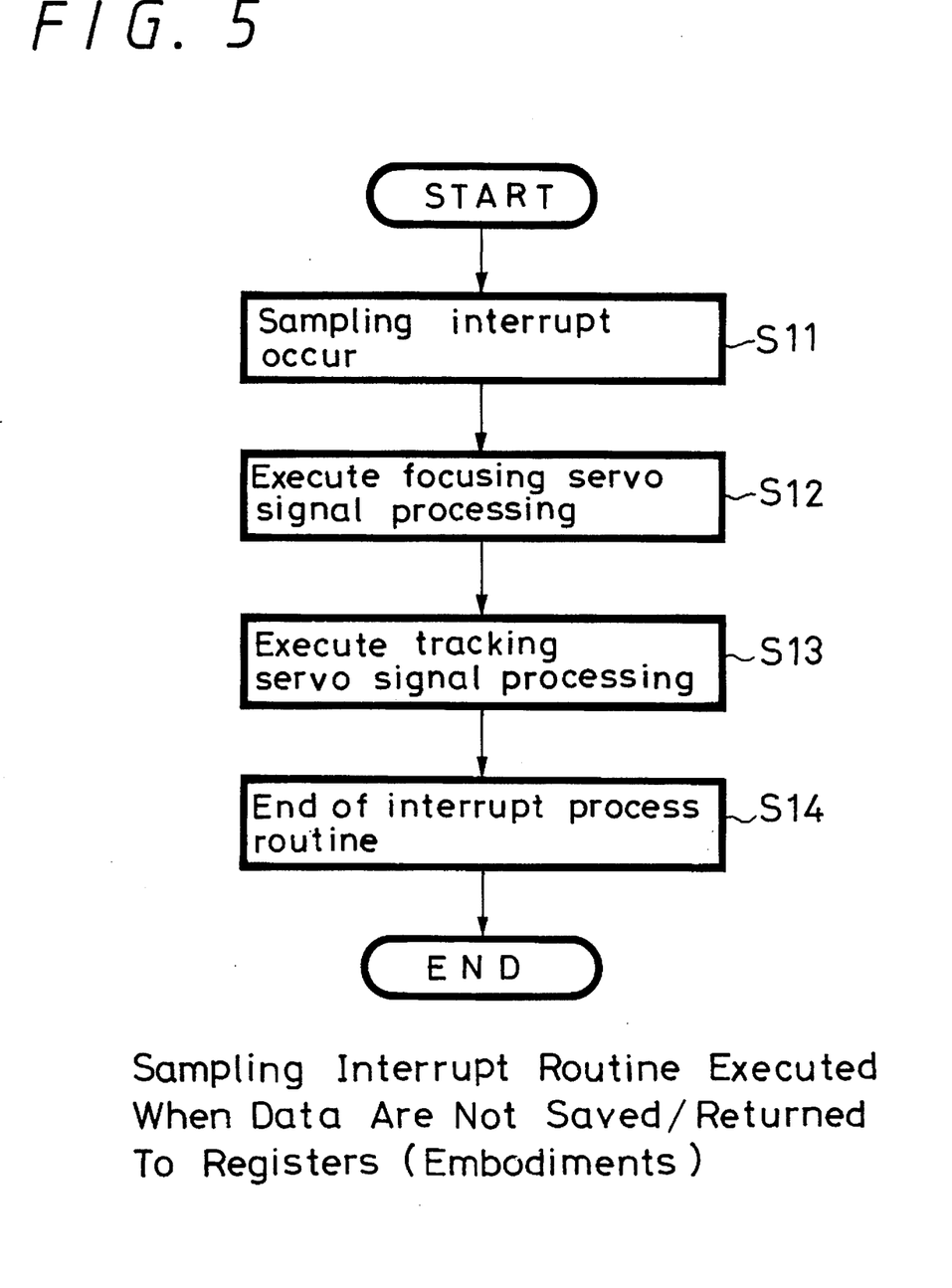
FIG. 5 is a flowchart of a sampling interrupt routine in accordance with the present invention.

In order to remove the aforesaid disadvantages, according to the invention, the internal registers in the DSP 13 are divided, preferably in half, with one group of the internal registers allocated exclusively to the interrupt routine for servo signal processing while the other group of the internal registers is allocated exclusively to system control processing. With the above-mentioned allocation, as shown in a flowchart of FIG. 5, when a sampling interrupt occurs (at step S11), the servo signal processing 1 of a focusing servo signal processing (at step S12) and a tracking servo signal processing (at step S13) is executed by using the registers provided to exclusively execute the servo signal processing interrupt routine without the need to save data from the internal registers 21 through 25. After the end of the servo processing, the interrupt processing routine can be ended (at step S14) without returning data to the internal registers 21 through 25. Therefore, the time required for executing the servo signal processing interrupt routine can be reduced.

The time saved is thus the time required for data to be saved from and returned to the internal registers 21 through 25 in the DSP 13. When the DSP 13 is, for example, the aforesaid Motorola DSP56001, there are provided 34 internal registers 21 through 25 in total, which require a time corresponding to 68 steps. Assuming a DSP operation speed of 100 nsec/step and a servo signal sampling rate of 30 kHz, then a maximum 33 steps for the program can be executed in one interrupt routine and a time of 33.3 μsec is required. Thus, 68 steps require a time of 6.8 μsec, i.e., about 20% of time is consumed in saving and returning data from and to the internal registers 21 to 25. If the servo processing uses 200 steps, for example, 65 steps {333−(200+68)} are available during one sampling period for processing other than the servo signal processing, such as a system control processing or the like, and a time of 6.5 p, sec is required for these 65 steps.

As will be described with reference to FIG. 6, when the internal registers 21 through 25 of the DSP56001 are divided in half to provide the registers used exclusively to execute the servo signal processing (interrupt routine) and the registers used exclusively to execute the system control processing, data in the internal registers 21 through 25 need not be saved and returned. Therefore, 133 steps (13.3 μsec) can be used for the system control processing 2 during one sampling period TS, and the speed at which the system control processing is executed becomes about twice as compared with that of the prior art. Thus, other system functions such as scanning and track selection, can be performed more quickly. In addition, a memory area of the program RAM 12 corresponding to 68 steps can be saved.

FIG. 6 shows arrangements of the internal registers 21 through 25 of the DSP56001 in accordance with an embodiment of the present invention. The internal registers 21 through 25 are formed of 34 registers in total of four 24-bit registers X1, X0, Y1, Y0 forming a data ALU input register 21, two 8-bit registers A2, B2 and four 24-bit registers A1, A0, B1, B0 forming an accumulator register 22, eight 16-bit registers R0 to R7 forming a pointer register 22, eight 16-bit registers N0 to N7 forming an offset register 23, and eight 16-bit registers M0 to M7 forming a modifier register 25.

The 17 registers shown hatched are exclusively allocated to the execution of servo signal processing and the remaining 17 registers that are shown as not hatched are exclusively allocated to execution of system control processing.

Specifically, the registers that are exclusively used to execute the servo signal processing are the registers A0 to A2, X0, Y0, R2 to R5, N2 to N5 and M2 to M5. The registers that are used exclusively to execute the system control processing are registers B0 to B2, X1, Y1, R0, R1, R6, R7, N0, N1, N6, N7, M0, M1, M6 and M7.

As described above, according to the embodiments of the present invention, the internal registers 21 through 25 in the DSP 13 are allocated to provide registers that are used exclusively to execute the servo signal processing and the system control processing, whereby the two processings can be executed by the DSP 13 with ease. Thus, the optical disk apparatus itself can be made inexpensively.

As set forth, according to the present invention, a portion of the internal registers in the digital signal processor are exclusively allocated to the execution of first priority interrupt processing. Therefore, even when first priority interrupt processing occurs, data within all of the internal registers in the digital signal processor including the registers exclusively allocated to the execution of first priority interrupt processing need not be saved and returned within the interrupt processing routine. Accordingly, the time required to save and return data can be eliminated perfectly and the capacity of the program memory therefor can be reduced.

When the first priority interrupt processing is the servo signal processing, the servo signal processing and other processing, such as the system control processing or the like can be executed solely by the digital signal processor with ease.

Although only a few embodiments have been described in detail above, those having ordinary skill in the art will certainly understand that many modifications are possible without departing from the teachings thereof. All such modifications are intended to be encompassed within the following claims.

We claim:

1. An optical disk apparatus comprising:

an optical pickup having a photo-detector;

means for generating a servo error signal in response to an output signal from the photo-detector;

a digital signal processor for executing processing of signals including the servo error signal;

first and second registers within the digital signal processor, the first registers exclusively allocated to storage of data utilized in execution of servo error signal processing, the second registers allocated to storage of data utilized in execution of processing of signals other than the servo error signal, at least a portion of the data utilized in the execution of the servo error signal processing being stored only in the first registers;

means for generating an interrupt signal and for supplying said interrupt signal to the digital signal processor, the digital signal processor executing servo error signal processing in response to the interrupt signal; and servo means for controlling the optical pickup in response to the processed servo error signal.

2. The optical disk apparatus of claim 1, further comprising:

an optical disk; and a motor for driving the optical disk.

3. The optical disk apparatus of claim 4 wherein the optical pickup further comprises:

a focusing actuator;

a tracking actuator; and a slide motor, the actuators and slide motor operative to position the photo-detector to read tracks of the optical disk.

4. The optical disk apparatus of claim 3 further comprising:

driver means for driving the focusing actuator, tracking actuator and slide motor; and an analog-to-digital converter for coupling the driver means to the digital signal processor.

5. The optical disk apparatus of claim 1 wherein the first and second registers further comprise:

at least one arithmetic logic unit register;

at least one accumulator register;

at least one pointer register;

at least one offset register; and at least one modifier register.

6. The optical disk apparatus of claim 5 wherein a portion of each of the arithmetic logic unit register, the accumulator register, the pointer register, the offset register and the modifier register is allocated to execution of servo error signal processing.

7. An optical disk apparatus comprising:

a motor for driving an optical disk;

an optical pickup having a photo-detector, and having a focusing actuator, a tracking actuator and a slide motor operative to position the photo-detector;

a matrix amplifier for generating a radio frequency signal and a servo error signal in response to an output signal from the photo-detector;

an analog-to-digital converter for digitizing the servo error signal;

a radio frequency signal processor for generating a binary data signal and a reproduced clock signal from the radio frequency signal;

a decoder for demodulating the binary data signal and extracting address information of the optical disc from the binary data signal;

a digital signal processor for executing processing of signals including the demodulated binary data signal and the digitized servo error signal;

first and second registers within the digital signal processor, the first registers exclusively allocated to storage of data utilized in execution of servo error signal processing, the second registers allocated to storage of data utilized in execution of processing of signals other than the servo error signal, at least a portion of the data utilized in the execution of the servo error signal processing being stored only in the first registers;

a timer for generating an interrupt signal provided to the digital signal processor, the digital signal processor executing servo error signal processing in response to the interrupt signal;

a digital-to-analog converter for converting into analog drive signals digital drive signals generated by the digital signal processor in response to the processed servo error signal; and a driver for driving the focusing actuator, tracking actuator and slide motor in response to the analog drive signals.

8. The optical disk apparatus of claim 7 wherein the first and second registers further comprise:

at least one arithmetic logic unit register;

at least one accumulator register;

at least one pointer register;

at least one offset register; and at least ode modifier register.

9. The optical disk apparatus of claim 8 wherein a portion of each of the arithmetic logic unit register, the accumulator register, the pointer register, the offset register and the modifier register is allocated to execution of servo error signal processing.

10. The optical disk apparatus of claim 7 further comprising:

a laser diode within the optical pickup, the laser diode operative to irradiate the optical disk; and means for modulating the demodulated binary data signal to control the intensity of light from the laser diode.

11. The optical disk apparatus of claim 10 further comprising:

a random access memory coupled to the digital signal processor, the random access memory operative to store a program for execution by the digital signal processor.

12. The optical disk apparatus of claim 11 further comprising:

a controller coupled to the digital signal processor, to the decoder and to the means for modulating, the controller operative to exchange commands and status data with the digital signal processor.

* * * * *